INVENTOR.
RALPH T. OSEN
BY Clyde C. Blinn
ATTORNEY

United States Patent Office 3,050,610
Patented Aug. 21, 1962

3,050,610
CONTROL APPARATUS
Ralph T. Osen, Minneapolis, Minn., assignor to Minneapolis-Honeywell Regulator Company, Minneapolis, Minn., a corporation of Delaware
Filed June 23, 1959, Ser. No. 822,301
5 Claims. (Cl. 219—20)

The present invention is concerned with an improved condition control system; in particular, the system has a sequencer for controlling the combined output of a plurality of temperature changing devices to satisfy a space temperature responsive device. One of the switches of the sequencer is connected in the electrical circuit to provide the dual function of controlling one stage of temperature apparatus and a limit control for the actuator of the sequencer.

In temperature control systems which are adapted to control electric strip heaters, the stages of electric heat are sometimes controlled by a step controller which has a motor driven in response to the output of a thermostat. Such systems generally made use of position follow-up control networks which established a predetermined position for the step controller motor for a predetermined heat load.

The present invention connects a cycling thermostat to a reversible motor; so that, the average on time of the thermostat as determined by the heat load adjusts the step controller or sequencer to have a certain output of the condition changing means. As the heat load increases, cyclic electric pulses from the thermostat drive the step controller in a forward direction, and during the off periods between pulses, the motor is driven in the off direction; so that, the combined output of the condition changing means increases to meet the new load. When the step controller reaches a low limit to de-energize the first stage of condition changing apparatus, the energization of the motor in the off direction is terminated by the same circuit.

An object of the present invention is to provide an improved condition controlling system.

Another object of the present invention is to provide in an improved condition controlling system a network circuit to accomplish the dual function of controlling one stage of condition changing apparatus and the motor position limiting device.

These and other objects will become apparent upon the study of the specification and drawings in which.

Figure 1:
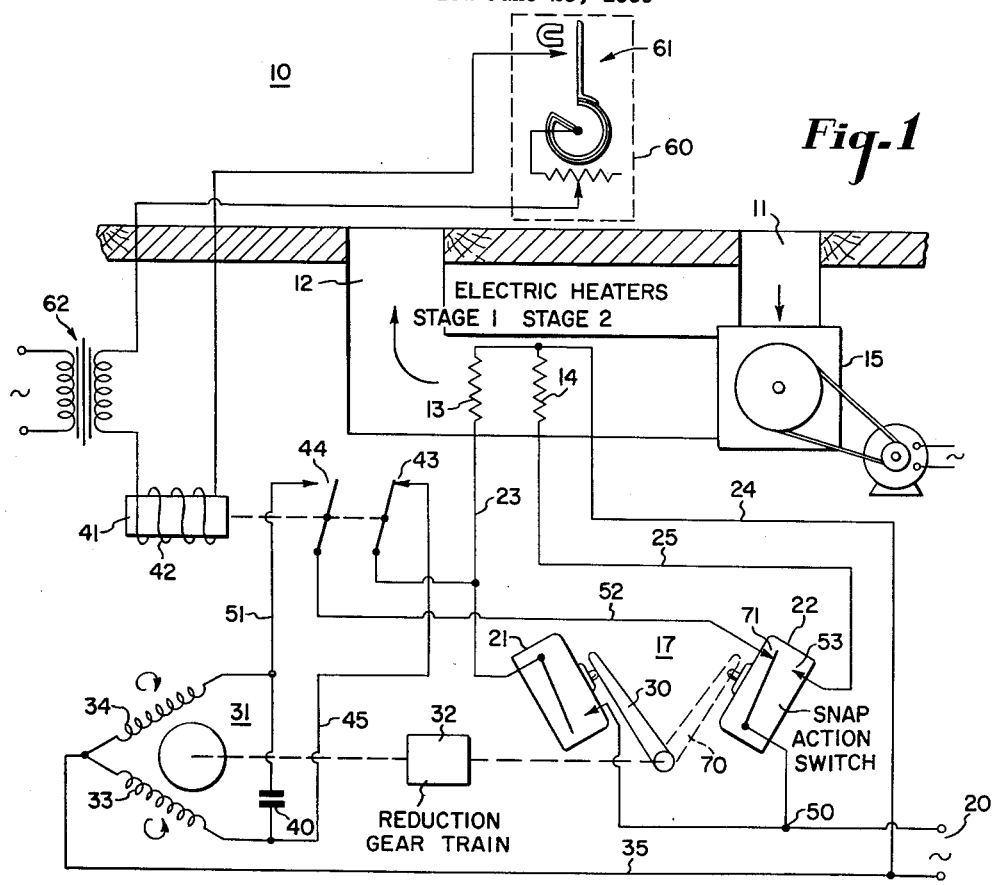
FIGURE 1 is a schematic representation of the present invention shown as applied to an electric heating application.

Referring to FIGURE 1, a space 10 is heated by the circulation of air into a return duct 11 and out of a supply duct 12 of a conventional electric heating system having two electric heaters 13 and 14 and a fan 15. The strip heaters 13 and 14 which form stages 1 and 2 of the electric furnace are connected to a source of power 20 through conventional snap switches 21 and 22, respectively of a sequencer or step controller 17. A circuit for strip heater 13 can be traced as follows: from the source of power 20, switch 21 which is normally closed, a conductor 23, heater 13, a conductor 24, and back to the source of power. Strip heater 14 is connected to the same source of power through a circuit traced as follows: from the source of power, a normally open circuit 53 of switch 22, a conductor 25, heater 14, conductor 24, and back to the source of power. A switch actuating means or lever 30 is connected to a conventional reversible motor 31 through a reduction gear train 32 to slow down the operation of lever 30. When lever 30 moves in a counterclockwise direction to engage an operating button of switch 21, heater 13 is de-energized. Upon a forward movement of motor 31, lever 30 engages an operating button of switch 22 to energize heater 14.

Motor 31 is a conventional reversible motor having a counterclockwise rotation winding 33 and a clockwise rotation winding 34 each of which has one extremity connected together to source of power 20 by conductor 35. The other extremities of windings 33 and 34 are connected together by a condenser 40.

A relay 41 has an energization circuit 42, a normally closed switch 43, and a normally open switch 44. The other extremity of winding 33 is connected to source of power 20 through a circuit traced as follows: from winding 33, a conductor 45, normally closed switch 43, switch 21, and a terminal 50 of source of power 20. The other extremity of winding 34 is connected to source of power 20 through a circuit traced as follows: from winding 34, a conductor 51, normally open switch 44, conductor 52, a normally closed circuit 71 of switch 22, and to terminal 50 of the source of power. By means of relay 41, motor 31 is energized in a counterclockwise direction (as shown), and the motor is energized in a clockwise direction when relay 41 is energized to close switch 44.

A space thermostat 60 has a switch 61 connected in the circuit to supply power from a source of power 62 to coil 42 of relay 41. The thermostat also contains a series connected heater 63 for "heat anticipation" purposes. Thermostat 60 provides for cyclic operation of switch 61 depending upon the deviation between the control point of the thermostat and the space temperature in space 10. The rate of operation of switch 61 can be adjusted by the value of heater 63. When switch 61 is closed, motor 31 is driven in a clockwise direction; so that, lever 30 moves clockwise to first close switch 21. Motor 31 rotates in the clockwise direction at the same speed as it rotates in the counterclockwise direction; therefore, the length of the closed and opened periods of switch 61 determines the average position of lever 30.

When motor 31 drives lever 30 to the dotted position 70, the operating button of switch 22 is pushed to open the normally closed circuit 71 and close circuit 53 to stop motor 31 and to energize heater 14. Since switch 22 is a snap acting switch, motor 31 will be de-energized at the same time that stage 2 of the electric heaters is energized. When thermostat 60 is satisfied and switch 61 opens, the counterclockwise winding 33 is energized to move lever 30 in a counterclockwise direction.

By the proper selection of the cycling rate of thermostat 60, the change in heating load is properly reflected to sequencer 17 to energize the stages of electric heating sufficiently to satisfy the heating load. As the heating load increases, stage No. 1 is cyclically energized until the stage is 100% on. At that time stage No. 2 is cyclically energized.

Figure 2:
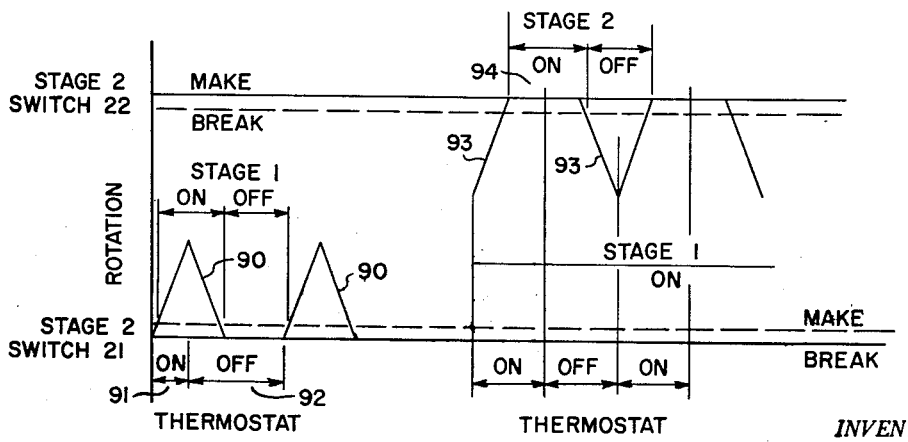
FIGURE 2 is a graphical representation of the operation of the system of FIGURE 1.

The operation of the control system is best described with the graphical representation shown in FIGURE 2. The rotation of the switch actuating lever 30 is plotted as a function of time. Since the movement of motor 31 for a given time is the same in the forward direction as it would be in the reverse direction for the same time, a triangular shaped graph 90 is shown for a thermostat on-time represented by 91. The on-time of stage 1 or the closed time of switch 21 is represented between the points at which curve 90 intersects the horizontal make and break lines for switch 21. The spacing of curves 90 is determined by the length of the thermostat off-period represented by 92. As long as the on and off period remains as represented by 91 and 92, respectively, the length of the on and off periods for stage 1 will remain the same. If the temperature of space 10 drops by an increase in the heating load, the on-period of the thermostat 60 will increase. The energization of motor 31 in the forward direction will increase to drive lever 30 further in a clockwise direction to increase the height of the characteristic curve similar to 90. As the lever 30 cycles back and forth, the average position of the lever will move in a clockwise direction until a stable operating position is reached such as shown with the characteristic curve 93 in FIGURE 2. The rotation of lever 30 moves clockwise during the on-time of the thermostat and counterclockwise during the off-time of the thermostat. The on-time of stage 2 is determined by the closed time of switch 53 or the period 94 between the intersection of curve 93 and the horizontal make and break lines of switch 22. For every stable heating load the length of the on and off-time of the thermostat will remain unchanged; so that, the average output of the electric heaters will be constant.

Referring to FIGURE 1, the cyclic operation of thermostat 60 produces the cyclic operation of motor 31; so that, the on-time of heaters 13 and 14 is adjusted to match the heating load needed to satisfy the thermostat controlling the temperature in space 10. When the heating load increases to a predetermined value, the average position of lever 30 is such that switch 21 is constantly on. Such a condition would be indicated in FIGURE 2 by increasing the height of curves 90. In other words, curve 90 would never drop below the break line for switch 21. As the lever cycled back and forth to operate switch 22, the heater 14 would be cycled an amount sufficient to satisfy the heating load of space 10. As the heating load of space 10 increased, the length of the on-time 94 as shown in FIGURE 2 would increase until switch 70 remained closed 100% of the time representing a full output of electric heater 14.

With switch 21 providing the dual function of controlling stage 1 or heater 13 and acting as a limit switch for motor 31 to open the counterclockwise energization circuit, the possible differential which might exist between the position of lever 30 for operating stage 1 and the position of rest by the de-energization of motor 31 is reduced to a minimum. Generally, the limit switch is a separate switch; however, considerable difficulty was experienced in adjusting two switches to keep the differential between the operation of the switches to a minimum. If two switches were used the angular position of lever 30 for the operation of the switch controlling stage 1 and the operation of a limit switch would have to be sufficiently great to insure reliability of the system. If two switches were used and the operation should overlap, the motor might be turned off by the low limit switch before the stage 1 was de-energized.

By using switching 21 as both the limit switch and the stage control switch, the number of switches is reduced to a minimum, and there is no difficulty in maintaining a differential in the position of lever 30. As soon as stage 1 is de-energized by the operation of switch 21, motor 31 is de-energized. Upon a call for heat by thermostat 60, stage 1 is immediately operated as there is substantially no travel necessary for lever 30 to move from the de-energized position of motor 31 to the position of operation of switch 21.

While the present invention has been shown in connection with a temperature control system making use of strip heaters, obviously, the invention might be readily applied to other types of condition controlling systems; therefore, the scope of the present invention is intended to be limited only by the appended claims.

I claim:

1. In a temperature control system, a temperature responsive means responsive to a space temperature, space temperature changing apparatus, relay means, connection means connecting said responsive means to control said relay means, said relay means having a normally closed switch and a normally open switch operated thereby, a reversible motor having a first energization circuit for operating said motor in a forward direction and a section energization circuit for operating said motor in a reverse direction, a source of power, a plurality of switches, connection means connecting said motor to said plurality of switches for operating said plurality of switches in sequence as said motor moves in a forward direction, a first switch of said plurality of switches providing a closed circuit upon an initial movement of said motor in a forward direction, connection means including said normally open switch for connecting said first energization circuit to said source, connection means including said first switch and said normally closed switch for connecting said second energization circuit to said source of power, and circuit means including said first switch connecting said space temperature changing apparatus to said source whereby said first switch performs a dual function of a limit switch and a control switch to limit the motor movement in the reverse direction after the conditioning changing apparatus is de-energized.

2. In a temperature control system, temperature responsive switch means responsive to the temperature in a space in which the temperature is changed by a plurality of temperature changing apparatuses, a step controller having a plurality of switches for selectively connecting said plurality of temperature changing apparatuses to a source of power, a source of power, reversible motor means, means connecting said motor means to said step controller whereby said plurality of apparatuses are energized in sequence when said motor moves in a forward direction to close said switches in sequence, connecting means including said responsive means for connecting said source to said motor means for operation in said forward direction, and second connecting means for connecting said motor means to said source for operation of said step controller in a reverse direction, said second connection means including said responsive switch means and a first of said plurality of switches so that upon said reverse operation of said step controller said motor is de-energized substantially at the same time a first of said changing apparatuses to be energized in said sequence is de-energized.

3. In a temperature control system, space temperature responsive switch means, a temperature changing device, reversible switch actuating means for operating at least one switch, said switch being adapted to control the energization of said temperature changing device for changing the temperature of the space, means connecting said responsive means to said reversible actuating means to control the operation of said actuating means in a first direction to close said switch and render said changing device operative, and second means including said switch connecting said actuating means to said responsive switch means to control the operation of said actuating means in an opposite direction to said first direction whereby upon de-energization of said changing device said actuating means is de-energized and a limit in the movement of said actuating means exists substantially at the same time when said temperature changing device is de-energized.

4. In a condition control system, condition responsive switch means, condition changing means, reversible switch actuating means for controlling the operation of a first switch, said first switch being adapted to control the energization of said condition changing means, said switch actuating means having an energization circuit for causing said actuating means to operate said first switch to energize said condition changing means, a source of power, circuit means including said responsive switch means for connecting said actuating means to said source of power to move said actuating means in a switch closing direction to energize said condition changing means, and circuit means including said first switch and said responsive switch means for connecting said actuating means to said source of power to move said actuating means in a switch opening direction whereby said first switch limits the operation of said actuating means after said first switch opens at the same time that said condition changing means is de-energized.

5. In a control system, a condition changing device, control means, reversible switch actuating means for operating at least one switch, means connecting said switch to control said condition changing device by closing said switch upon the initial operation of said actuating means in a first direction, means connecting said control means to said reversible actuating means to control the operation of said actuating means in said first direction, and second means including said switch connecting said actuating means to said control means to control the operation of said actuating means in an opposite direction to said first direction whereby upon de-energization of said changing device said actuating means is de-energized and a limit in the movement of said actuating means exists substantially at the same time when said changing device is deenergized by opening said switch.

References Cited in the file of this patent
UNITED STATES PATENTS

| | | |
|---|---|---|
| 2,095,383 | Finch | Oct. 12, 1937 |
| 2,125,110 | Harty | July 26, 1938 |
| 2,386,009 | Smith | Oct. 2, 1945 |
| 2,496,199 | Bushway | Jan. 31, 1950 |
| 2,594,984 | Penther et al. | Apr. 29, 1952 |
| 2,700,505 | Jackson | Jan. 25, 1955 |